United States Patent [19]

Yamaguchi et al.

[11] 4,224,103

[45] Sep. 23, 1980

[54] BONDING COMPOSITION FOR INCOMBUSTIBLE FIBROUS MATERIALS

[75] Inventors: Hideo Yamaguchi, Naruto; Masahiro Kobayashi, Tokushima; Atsunobu Mizote, Nara; Yoshiyuki Iwamuro, Kyoto, all of Japan

[73] Assignees: Otsuka Chemical Co. Ltd.; Sansho Co., Ltd., both of Osaka, Japan

[21] Appl. No.: 52,597

[22] Filed: Jun. 27, 1979

[30] Foreign Application Priority Data

Jul. 7, 1978 [JP] Japan ................................. 53-83239

[51] Int. Cl.$^2$ .......................... D21H 1/10; B05D 3/02
[52] U.S. Cl. ..................................... 162/135; 162/152; 162/155; 162/156; 162/157 R; 162/159; 162/164 R; 162/168 N; 162/168 NA; 162/183; 162/184; 162/185; 427/389.8; 427/393.3
[58] Field of Search ................... 162/145, 152, 157 R, 162/159, 155, 156, 164 R, 168 N, 168 NA, 183, 135, 184, 185; 525/327, 376, 320; 260/6 CM; 427/385, 390

[56] References Cited

U.S. PATENT DOCUMENTS

4,171,413  10/1979  Hartman et al. ..................... 525/376

FOREIGN PATENT DOCUMENTS

43-4524 of 1968 Japan ................................ 162/168 NA
833459  4/1960  United Kingdom ..................... 525/376
839377  6/1960  United Kingdom ..................... 525/376

OTHER PUBLICATIONS

Machida, "An Application of Polyacrylic Hydrazide", Sci. Reports of Fac. of Tex. Fib., Kyoto University of Ind .Arts & Tex. Fib., vol. I, (1970), pp. 38-43.

*Primary Examiner*—Richard V. Fisher
*Assistant Examiner*—Peter Chin
*Attorney, Agent, or Firm*—Armstrong, Nikaido, Marmelstein, & Kubovcik

[57] ABSTRACT

A bonding composition for incombustible fibrous materials comprising (a) a water-soluble polymer containing hydrazide groups or its adduct with a water-soluble alkaline earth metal salt of an inorganic acid and (b) a heavy metal ion capable of forming chelate with the water-soluble polymer or its adduct. The bonding composition is employed as bonding agents to prepare incombustible sheet materials from incombustible fibrous materials by adding the components (a) and (b) to an aqueous dispersion of the fibrous materials and forming sheets or by forming wet or dry sheets containing the component (b) and then making the component (a) contain in the sheets. The bonding composition has excellent bonding effect and the polymer itself becomes incombustible, so incombustible sheet materials having excellent strength can be economically obtained.

5 Claims, No Drawings

BONDING COMPOSITION FOR INCOMBUSTIBLE FIBROUS MATERIALS

BACKGROUND OF THE INVENTION

The present invention relates to a composition useful as a bonding agent for incombustible fibrous materials and a process for preparing incombustible sheet materials. More particularly the invention relates to a bonding composition which can effectively bond incombustible fibrous materials and also becomes incombustible itself, comprising (a) a specific water-soluble polymer containing hydrazide groups or its adduct with a water-soluble alkaline earth metal salt of an inorganic acid and (b) a specific heavy metal ion, and a process for preparing incombustible materials such as paper, sheet and board using the bonding composition.

Hitherto, various inorganic fibers such as asbestos, rock wool, glass fiber, ceramic fiber, carbon fiber and metal fiber are known as incombustible fibers. Also, various bonding agents are known. However, since these known bonding agents are combustible or expensive and no incombustible and inexpensive bonding agent having an excellent bonding effect has been known, incombustible sheet materials obtained from these incombustible fibers have a decreased incombustibility or rise in price despite that some incombustible fibers are inexpensive.

SUMMARY OF THE INVENTION

It has now been found that a specific water-soluble polymer containing hydrazide groups or its adduct with a water-soluble alkaline earth metal salt of an inorganic acid, when it is employed in combination with a heavy metal ion capable of chelating therewith, becomes easy to fix to incombustible fibrous materials and exhibits an excellent effect of bonding the fibrous materials and moreover becomes incombustible itself, so incombustible sheet materials such as paper, sheet and board having excellent strength and incombustibility can be economically obtained.

According to the present invention, there is provided a bonding composition comprising (a) a water-soluble polymer containing hydrazide groups of the following general formula:

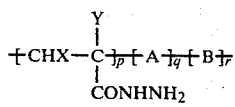

wherein X is hydrogen atom or carboxyl group, Y is hydrogen atom or methyl group, A is acrylamide unit, methacrylamide unit, an acrylate unit, a methacrylate unit or maleic anhydride unit, B is a unit derived from a monomer copolymerizable with acrylamide, methacrylamide, an acrylate, a methacrylate or maleic anhydride, and there is the following relationship among p, q and r:
  p+q+r=100% by mole
  20% by mole≦p≦100% by mole
  0% by mole≦q+r≦80% by mole
or its adduct with a water-soluble alkaline earth metal salt of an inorganic acid, and (b) 0.03 to 200 parts by weight, per 100 parts by weight of the water-soluble polymer or its adduct (a), of a heavy metal ion capable of chelating with said water-soluble polymer or its adduct.

The present invention also provides a process for preparing incombustible sheet materials which comprises bonding an incombustible fibrous material with a bonding composition comprising (a) a water-soluble polymer containing hydrazide groups of the following general formula:

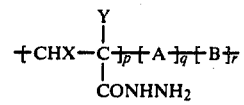

wherein X is hydrogen atom or carboxyl group, Y is hydrogen atom or methyl group, A is acrylamide unit, methacrylamide unit, an acrylate unit, a methacrylate unit or maleic anhydride unit, B is a unit derived from a monomer copolymerizable with acrylamide, methacrylamide, an acrylate, a methacrylate or maleic anhydride, and there is the following relationship among p, q and r:
  p+q+r=100% by mole
  20% by mole≦p≦100% by mole
  0% by mole≦q+r≦80% by mole
or its adduct with a water-soluble alkaline earth metal salt of an inorganic acid, and (b) a heavy metal ion capable of chelating with said water-soluble polymer or its adduct, said water-soluble polymer or its adduct (a) and said heavy metal ion (b) being employed in amounts of 1% to 30% by weight and 0.0001% to 2% by weight, respectively, based on the weight of said incombustible fibrous material.

DETAILED DESCRIPTION

There are employed as a component (a) of the bonding composition of the present invention water-soluble polymers containing hydrazide groups of the following general formula:

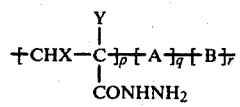

wherein X is hydrogen atom or carboxyl group, Y is hydrogen atom or methyl group, A is acrylamide unit, methacrylamide unit, an acrylate unit, a methacrylate unit or maleic anhydride unit, B is a unit derived from a monomer copolymerizable with acrylamide, methacrylamide, an acrylate, a methacrylate or maleic anhydride, and there is the following relationship among p, q and r:
  p+q+r=100% by mole
  20% by mole≦p≦100% by mole
  0% by mole≦q+r≦80% by mole
and their adducts with water-soluble alkaline earth metal salts of inorganic acids.

The water-soluble polymer containing hydrazide groups of the above general formula is hereinafter referred to as "hydrazide polymer."

The hydrazide polymer or its adduct forms a chelate with a heavy metal ion and once changes to a semiliquid or semi-solid amorphous substance easy to fix to incombustible fibrous materials so as to bond effectively the fibrous materials to each other, and thereafter the chelate formation further proceeds and strong crosslinkage is formed between the hydrazide polymer chains so that the polymer itself becomes water-insoluble and incombustible. As a result, incombustible sheet materials having excellent strength and incombustibility can be economically obtained.

The hydrazide polymers employed in the present invention may be any of those shown in the above general formula where each unit is linked alternately or in block or in random. In general, the hydrazide polymers are prepared by thermally reacting homo- or co-polymers of acrylamide, methacrylamide, an acrylate, a methacrylate or maleic anhydride, or copolymers of these monomers with other monomers copolymerizable therewith, with 1 to 30 moles of hydrazine hydrate per mole of the acrylamide, methacrylamide, acrylate, methacrylate or maleic anhydride unit in the polymer chain. In some cases, the copolymerizable monomer units, i.e. the monomer units (B) may react with hydrazine hydrate. For instance, in case that vinyl acetate is copolymerized as a monomer copolymerizable with acrylamide, methacrylamide, an acrylate, a methacrylate or maleic anhydride, the acetoxyl groups of the vinyl acetate units are hydrolyzed by hydrazine hydrate to hydroxyl groups. Such polymers are also included in the hydrazide polymers as defined above. Also, hydrazide group may intramolecularly or intermolecularly react with other hydrazide group, an ester group or amide group to cause crosslinking partially. Such polymers are also employed in the present invention unless they are insoluble in water.

Examples of the acrylate giving the acrylate unit which is one of the monomer unit (A) of the hydrazide polymer employed in the present invention are acrylic acid alkyl esters such as methyl, ethyl, butyl and 2-ethylhexyl acrylates. Examples of the methacrylate giving the monomer unit (A) are methacrylic acid alkyl esters such as methyl, ethyl and butyl methacrylates. Examples of the monomer giving the monomer unit (B) are vinyl chloride, vinylidene chloride, vinyl acetate, butadiene, styrene, acrylic acid and acrylonitrile.

It is necessary that the hydrazide polymers employed in the present invention contain at least 20% by mole of hydrazide group. When the content of hydrazide group is less than 20% by mole, the characteristic bonding effect exhibited by the combination use with a heavy metal ion cannot be obtained. Also, there is preferred the hydrazide polymer having an average molecular weight of not less than 2,000 and an intrinsic viscosity $[\eta]$ of not more than 28 in water at 25° C.

In the present invention, the hydrazide polymer can be employed in the form of adduct with a water-soluble alkaline earth metal salt of an inorganic acid. Examples of the water-soluble alkaline earth metal salt of an inorganic acid are alkaline earth metal halides, sulfates and nitrates such as calcium halides, magnesium halides, barium halides, strontium halides, beryllium halides, magnesium sulfate, magnesium nitrate and calcium nitrate. In particular, calcium chloride is preferably employed from an economical point of view.

The hydrazide polymer or its adduct is employed in combination with a heavy metal ion capable of forming chelate therewith. Examples of the heavy metal ion employed as a component (b) of the bonding composition of the present invention are ions of copper, cobalt, lead, zinc, iron, tin, mercury, nickel, cadmium and manganese. The heavy metal ion is employed in an amount of 0.03 to 200 parts by weight, preferably 0.1 to 30 parts by weight, per 100 parts by weight of the hydrazide polymer or its adduct (a). These heavy metal ions may be employed singly or in admixture thereof.

The bonding composition of the present invention is very suitable for use in preparing incombustible materials such as incombustible paper, sheet and board from incombustible fibrous materials. Inorganic fibrous materials such as asbestos, rock wool, glass fiber, ceramic fiber, carbon fiber and metal fiber are employed as the incombustible fibrous materials. Organic fibrous materials such as pulps and synthetic fibers treated with flame retardant agents to impart the flame resistance thereto are also usable as the incombustible fibrous materials, and such flame resistant organic fibrous materials may be those obtained by making flame retardant agents contain in the organic fibrous materials upon the preparation thereof or those obtained by fixing flame retardant agents to the organic fibrous materials by means of coating, spraying and impregnation.

Incombustible sheet materials are prepared in various means by employing the bonding composition of the present invention. For instance, there are applicable a process (1) in which a hydrazide polymer or its adduct and a heavy metal ion are added to an aqueous dispersion of an incombustible fibrous material and a sheet material such as paper, sheet or board is formed, a process (2) in which a wet sheet material containing a heavy metal ion is formed by adding the heavy metal ion to an aqueous dispersion of an incombustion fibrous material and then forming a sheet material or by forming a sheet material from an aqueous dispersion of an incombustible fibrous material and then making the heavy metal ion contain in the resulting sheet material by means of spraying or impregnation, and the wet sheet material is then sprayed or impregnated with an aqueous solution of a hydrazide polymer or its adduct, and a process (3) in which a dry sheet material containing a heavy metal ion is formed by drying a wet sheet material prepared in the same manner as in the process (2) and is then sprayed or impregnated with an aqueous solution of a hydrazide polymer or its adduct.

The hydrazide polymer or its adduct is employed in an amount of 1% to 30% by weight based on the weight of an incombustible fibrous material employed. When the amount of the hydrazide polymer or its adduct is less than 1% by weight, the strength of the obtained incombustible sheet material is low, and when the amount is more than 30% by weight, not only the bonding effect is not raised so much, but also the incombustibility is lowered. Also, the heavy metal ion is employed in an amount of 0.0001% to 2% by weight based on the weight of an incombustible fibrous material employed. When the amount of the heavy metal ion is less than 0.0001% by weight, the fixing of produced chelate to the fibrous material is insufficient, even if the heavy metal ion forms a chelate with the hydrazide polymer or its adduct. On the other hand, when the amount of the heavy metal ion is more than 2% by weight, the bonding effect is not raised so much and, therefore, the addition of more than 2% by weight of the heavy metal ion is unnecessary. There may be a case where a heavy metal ion is included in a fibrous material such as asbestos. In such a case, it is sufficient to employ the heavy metal ion in an amount which supplies the shortage.

The present invention is more particularly described and explained by means of the following Examples, in which all % and parts are by weight unless otherwise noted. In order to illustrate the preparation of the hydrazide polymers, the following Reference Examples are also presented.

REFERENCE EXAMPLE 1

A three liter autoclave was charged with 100 g. of polymethyl methacrylate having an average molecular weight of about 900,000 and 2 kg. of a 80% aqueous solution of hydrazine hydrate. After air within the autoclave was replaced with nitrogen gas, the reaction was carried out at 160° C. for 8 hours with agitation.

The obtained viscous reaction mixture was poured into about 20 liters of methanol to give a white precipitate. After conducting the purification by a reprecipitation method, the precipitate was dried at about 60° C. under reduced pressure. The content of hydrazide group of the obtained water-soluble hydrazide polymer was measured by an iodometric titration method. The content of hydrazide group was 95% by mole.

REFERENCE EXAMPLE 2

A three liter four neck flask was charged with 1 kg. of a 20% aqueous solution of polyacrylamide having an average molecular weight of about 45,000 and 1 kg. of a 80% aqueous solution of hydrazine hydrate, and the reaction was then carried out 50° C. for 3 hours with agitation. The obtained reaction mixture was treated in the same manner as in Reference Example 1 to give a white water-soluble hydrazide polymer. The content of hydrazide group of the obtained polymer was 37% by mole.

REFERENCE EXAMPLE 3

A three liter four neck flask was charged with 1 kg. of a 10% aqueous soluton of polyacrylamide having an average molecular weight of about 310,000 and 1 kg. of a 80% aqueous solution of hydrazine hydrate, and the reaction was then carried out at 50° C. for 20 hours with agitation. The obtained reaction mixture was treated in the same manner as in Reference Example 1 to give a white water-soluble hydrazide polymer. The content of hydrazide group of the obtained polymer was 89% by mole.

An aqueous solution containing an adduct of the hydrazide polymer with calcium chloride was prepared by dissolving 10 g. of the hydrazide polymer in 190 g. of a 20% aqueous solution of calcium chloride. It is considered that the adduct forms a complex salt.

REFERENCE EXAMPLE 4

A three liter four neck flask was charged with 1 kg. of a 20% aqueous solution of polyacrylamide having an average molecular weight of about 310,000 and 1 kg. of a 80% aqueous solution of hydrazine hydrate, and the reaction was then carried out at 55° C. for 5 hours with agitation. The obtained reaction mixture was treated in the same manner as in Reference Example 1 to give a white water-soluble hydrazide polymer. The content of hydrazide group of the obtained polymer was 55% by mole.

REFERENCE EXAMPLE 5

A 300 ml. four neck flask was charged with 40 g. of maleic anhydride polymer having an average molecular weight of about 4,000 which was prepared according to the process described in British Pat. No. 1,193,146 and 40 g. of a 50% aqueous solution of hydrazine hydrate. The reaction proceeded smoothly with liberating heat.

The obtained reaction mixture of low viscosity was cooled to about 0° C. and poured into 500 ml. of methanol to give a yellow precipitate. After conducting purification by a reprecipitation method, the precipitate was dried at 60° C. under reduced pressure. The obtained water-soluble hydrazide polymer had a content of hydrazide group of 97% by mole.

REFERENCE EXAMPLE 6

A three liter four neck flask was charged with 100 g. of acrylamide-styrene copolymer containing 12% by mole of the styrene units and 1.5 kg. of a 80% aqueous solution of hydrazine hydrate. The reaction was then carried out at 80° C. for 10 hours in a nitrogen stream with agitation. The obtained reaction mixture was treated in the same manner as in Reference Example 1 to give a white water-soluble hydrazide polymer. The obtained polymer had a content of hydrazide group of 82% by mole.

EXAMPLE 1

Into 20,000 parts of water were dispersed 375 parts of rock wool dried absolutely and 25 parts of opened asbestos dried absolutely, and 830 parts of a 1% aqueous solution of zinc chloride was added to the resulting dispersion and agitated for 1 minute. Then 400 parts of a 5% aqueous solution of the hydrazide polymer obtained in Reference Example 1 was added to the dispersion and was further agitated for 1 minute.

A board was formed by employing a TAPPI standard sheet machine. The drainage time was 10 seconds. The obtained wet web was dried by a hot press machine at 170° C. for 60 minutes to give a board having a thickness of 9 mm., a basis weight of 3,638 g./m.$^2$ and an apparent specific gravity of 0.455.

The bending strength of the obtained board was 52 kg./cm.$^2$, which was measured according to Japanese Industrial Standard (hereinafter referred to as "JIS") A 1408. Also, the incombustibility test was conducted according to JIS A 1321. The board passed as the first class incombustibility.

COMPARATIVE EXAMPLE 1

A dispersion of 375 parts of rock wool dried absolutely and 25 parts of opened asbestos dried absolutely in 20,000 parts of water was prepared. To the dispersion was added 400 parts of a 5% aqueous solution of cooked corn starch, and after agitating for 1 minute, 30 parts of a 10% aqueous solution of aluminum sulfate was added to the dispersion. After further agitating for 1 minute, a web was formed by employing a TAPPI standard sheet machine. The drainage time was 60 seconds. The obtained wet web was dried by a hot press machine at 170° C. for 60 minutes to give a board having a thickness of 9 mm., a basis weight of 3,489 g./m.$^2$ and an apparent specific gravity of 0.336.

The bending strength of the obtained board was 28 kg./cm.$^2$, and the board was failed in the third class incombustibility test according to JIS A 1321.

EXAMPLE 2

Into 20,000 parts of water was dispersed 100 parts of a glass fiber having a diameter of $9\mu$ and a length of 6 mm., and a glass mat was then formed by a TAPPI standard sheet machine. A 1% aqueous solution of ferric chloride was sprayed onto the glass mat, and the sprayed mat was dried by a rotary drier at 105° C. The resulting glass mat contained 0.05% of $Fe^{+++}$ ion to the glass fiber. A 2% aqueous solution of the hydrazide polymer obtained in Reference Example 2 was then sprayed to the glass mat containing ferric ion. After drying the glass mat by a drum drier at 105° C., curing was conducted at 180° C. for 2 minutes to give a glass fiber paper. The amount of the hydrazide polymer fixed to the mat was 7.0% to the glass fiber.

The obtained glass fiber paper had a basis weight of 93.1 g./m.$^2$, and also had a tensile strength of 1.90 kg./15 mm. which was measured according to JIS P 8113, a bursting strength of 1.46 kg./cm.$^2$ which was measured according to JIS P 8112, and a tearing strength of 138 g. which was measured according to JIS P 8116. Also, the incombustiblity test was conducted according to JIS A 1322. The glass fiber paper passed as the first class incombustibility.

EXAMPLE 3

Into 20,000 parts of water was well dispersed 100 parts of a glass fiber having a diameter of 9$\mu$ and a length of 6 mm., and 300 parts of the aqueous solution containing the adduct of the hydrazide polymer with calcium chloride, which was obtained in Reference Example 3, was added to the resulting dispersion. After gently agitating the dispersion, 0.15 part of cupric sulfate was added to the dispersion and was dissolved with gentle agitation. The sheet formation was then carried out by employing a TAPPI standard sheet machine. The resulting wet sheet was dried by a drum drier at 105° C. to give a glass fiber paper having a basis weight of 75 g./m.$^2$.

The obtained glass fiber paper had a tensile strength of 1.78 kg./15 mm., a bursting strength of 0.77 kg./cm.$^2$ and a tearing strength of 72.0 g., and also passed as the first class incombustibility according to JIS A 1322.

COMPARATIVE EXAMPLE 2

A dispersion of 100 parts of a glass fiber having a diameter of 9$\mu$ and a length of 6 mm. in 20,000 parts of water was prepared, and after adding 15 parts of a polyvinyl alcohol fiber (commercially available under the tradename "Fibribond 443" made by Kuraray Co., Ltd.) to the dispersion and gently agitating it, a sheet was formed by employing a TAPPI standard sheet machine to give a glass fiber paper having a basis weight of 82.3 g./m.$^2$.

The obtained glass fiber paper had a tensile strength of 1.28 kg./15 mm., a bursting strength of 0.66 kg./cm.$^2$ and a tearing strength of 92 g. Also, the glass fiber paper was subjected to the incombustibility test according to JIS A 1322. Flaming time was not less than 5 seconds and the paper failed in the third class incombustibility.

EXAMPLE 4

Into 20,000 parts of water was well dispersed 100 parts of a ceramic fiber having a diameter of 3$\mu$ and a length of 10 mm. (commercially available under the tradename "KAOWOOL" made by Isolite Babcock Refractory Co., Ltd.), and to the resulting dispersion was added 200 parts of a 5% aqueous solution of the hydrazide polymer obtained in Reference Example 4. After gently agitating the dispersion, 200 parts of a 1% aqueous solution of cupric sulfate was added to the dispersion and gently agitated. A sheet was then formed by employing a TAPPI standard sheet machine, and the resulting wet sheet was dried by a drum drier at 105° C. to give a ceramic fiber paper having a basis weight of 150.1 g./m.$^2$.

The obtained ceramic fiber paper had a tensile strength of 2.35 kg./15 mm., a bursting strength of 0.53 kg./cm.$^2$ and a tearing strength of 24.5 g. The ceramic fiber paper also passed as the first class incombustiblity according to JIS A 1322.

COMPARATIVE EXAMPLE 3

The same aqueous dispersion of a ceramic fiber as in Example 4 was prepared, and thereto was added 10 parts of a polyvinyl alcohol fiber (commercially available under the tradename "Fibribond 443" made by Kuraray Co., Ltd.) After gently agitating the dispersion, a sheet was formed by employing a TAPPI standard sheet machine and dried to give a ceramic fiber paper having a basis weight of 143.3 g./m.$^2$.

The obtained ceramic fiber paper had a tensile strength of 2.10 kg./15 mm., a bursting strength of 0.36 kg./cm.$^2$ and a tearing strength of 26 g. The incombustibility test was also conducted according to JIS A 1322. Flaming time was not less than 5 seconds and the paper failed in the third class incombustibility.

EXAMPLE 5

Into 20,000 parts of water was well dispersed 100 parts of rock wool, and 200 parts of a 5% aqueous solution of the hydrazide polymer obtained in Reference Example 4 was added to the resulting dispersion. After gently agitating the dispersion, 40 parts of a 5% aqueous solution of cupric sulfate was added to the dispersion and gently agitated. A sheet was then formed by employing a TAPPI standard sheet machine and the resulting wet sheet was dried by a drum drier at 105° C. to give a rock wool paper having a basis weight of 150.0 kg./m.$^2$.

The obtained rock wool paper had a tensile strength of 1.48 kg./15 mm., a bursting strength of 0.73 kg./cm.$^2$ and a tearing strength of 44.0 g. The rock wool paper also passed as the first class incombustibility according to JIS A 1322.

EXAMPLE 6

Into 10,000 parts of water was well dispersed 100 parts of a mixed fiber containing a glass fiber having a diameter of 9$\mu$ and a length of 6 mm. and a asbestos in a weight ratio of 7:3. To the resulting dispersion was added 30 parts of a 5% aqueous solution of cupric sulfate, and after gently agitating the dispersion, 400 parts of a 5% aqueous solution of the hydrazide polymer obtained in Reference Example 5 was added to the dispersion and gently agitated. A sheet was then formed by employing a TAPPI standard sheet machine and the resulting wet sheet was dried by a drum drier at 105° C. to give a glass-asbestos fiber paper having a basis weight of 51.1 g./m.$^2$.

The obtained glass-asbestos fiber paper had a tensile strength of 2.70 kg./15 mm., a bursting strength of 0.58 kg./cm.$^2$ and a tearing strength of 197 g. The paper also passed as the first class incombustibility according to JIS A 1322.

EXAMPLE 7

Into 20,000 parts of water was well dispersed 100 parts of a carbon fiber having a diameter of 12$\mu$ and a length of 5 mm., and from the resulting dispersion a carbon fiber mat was formed by employing a TAPPI standard sheet machine.

The mat was then sprayed with 50 parts of a 0.02% aqueous solution of cupric sulfate and further with 180 parts of a 5% aqueous solution of the hydrazide polymer obtained in Reference Example 6, and was dried by a hot air drier at 105° C. to give a carbon fiber paper having a basis weight of 55.0 g./m.²

The obtained carbon fiber paper had a tensile strength of 3.09 kg./15 mm., a bursting strength of 2.12 kg./cm.² and a tearing strength of 99 g. The paper also passed as the first class incombustibility according to JIS A 1322.

EXAMPLE 8

A hundred parts of L.B. kraft pulp was impregnated with a 40% aqueous solution of a condensed ammonium phosphate (commercially available under the tradename "FR-30" made by Otsuka Chemical Co Ltd), and after drying the impregnated pulp at 100° C., the pulp was cured at 165° C. for 30 minutes to give flame resistant pulp.

Into 20,000 parts of water was well dispersed 100 parts of the flame resistant pulp. To the resulting dispersion was added 0.015 part of cupric sulfate, and after dissolving it by gently agitating, 40 parts of a 5% aqueous solution of the hydrazide polymer obtained in Reference Example 4 was added to the dispersion and was gently agitated. A sheet was then formed by employing a TAPPI standard sheet machine and the resulting wet sheet was dried by a drum drier at 105° C. to give a flame resistant paper having a basis weight of 85 g./m.².

The obtained flame resistant paper had a tensile strength of 1.75 kg./15 mm., a bursting strength of 0.72 kg./cm.² and a tearing strength of 84 g. The paper also passed as the first class incombustibility according to JIS A 1322.

What we claimed is:

1. A process for preparing incombustible sheet materials which comprises forming a sheet from an aqueous dispersion of an incombustible fibrous material and, prior to or subsequently to the formation of the sheet, contacting the incombustible fibrous material with a bonding composition comprising (a) a water-soluble polymer containing hydrazide groups of the following general formula:

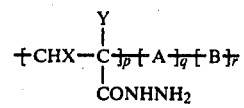

wherein X is hydrogen atom or carboxyl group, Y is hydrogen atom or methyl group, A is acrylamide unit, methacrylamide unit, an acrylate unit, a methacrylate unit or maleic anhydride unit, B is a unit derived from a monomer copolymerizable with acrylamide, methacrylamide, an acrylate, a methacrylate or maleic anhydride, and there is the following relationship among p, q and r:

$p+q+r = 100\%$ by mole
$20\%$ by mole $\leq p \leq 100\%$ by mole
$0\%$ by mole $\leq q+r \leq 80\%$ by mole or its adduct with a water-soluble alkaline earth metal salt of an inorganic acid, in the presence of (b) a heavy metal ion of a heavy metal selected from the group consisting of copper, cobalt, lead, zinc, iron, tin, mercury, nickel, cadmium and manganese to chelate said polymer or its adduct; said polymer containing hydrazide groups or its adduct and said heavy metal ion being employed in amounts of 1% to 30% by weight and 0.0001% to 2% by weight, respectively, based on the weight of said incombustible fibrous material.

2. The process of claim 1, wherein said water-soluble polymer or its adduct and said heavy metal ion are added to an aqueous dispersion of said incombustible fibrous material and a sheet material is formed.

3. The process of claim 1, wherein a sheet material containing said heavy metal ion is formed, and said water-soluble polymer or its adduct is impregnated into the sheet.

4. The process of claim 1, wherein said incombustible fibrous material is an inorganic fiber selected from the group consisting of asbestos, rock wool, glass fiber, ceramic fiber, carbon fiber and metal fiber.

5. The process of claim 1, wherein said incombustible fibrous fiber is an organic fiber treated with a flame retardant agent.

* * * * *